Patented Jan. 23, 1940

2,187,822

UNITED STATES PATENT OFFICE 2,187,822

MANUFACTURE OF PIGMENTS

Hugo Querengässer, Bitterfeld, Germany, assignor to I. G. Farbenindustrie Aktiengesellschaft, Frankfort-on-the-Main, Germany No Drawing. Application July 2, 1937, Serial No. 151,665. In Germany July 16, 1936

7 Claims. (Cl. 23—56)

This invention relates to the manufacture of pigments of low particle size and improved covering properties.

It is known that a certain resistance to corrosive influences can be imparted to metals and alloys by coating them with pigment colours, such as red lead, red iron oxide and the like. According to the prevailing view, this improved resistance to corrosion is mainly due to the formation of a protective layer of oxide on the surface of the metal, which protective layer resists attack by many chemicals and renders the metal superficially more electropositive. Another explanation of the protective effect of red lead coatings is that, in consequence of its water-repelling properties, the red lead prevents acid water from reaching the surface of the metal.

It has nevertheless been found that the protection afforded by coatings of pigments known to be water-insoluble, can relatively easily be destroyed by corrosive media, so that, for example on coated sheet iron, numerous pittings or wart-like points of corrosion are formed in the course of time, which denote that the protective oxidic coating obtained by painting with water-insoluble pigments having an oxidising action is, at least, incomplete.

The present invention contemplates the production of a pigment which possesses the property of imparting to the painted metal a passive surface having a greater capacity of resisting corrosion. Starting from the known fact that chromic acid and its water-soluble salts belong to the most powerful corrosion-preventing media in consequence of the formation of $CrO_4$ ions having a powerful passivating action, the invention is based on the conception that a coating medium on a chromate basis which will combine the properties of a pigment with a limited solubility in water, would thus be able, on contact with water, to emit a certain quantity of $CrO_4$ ions into solution, the presence of the $CrO_4$ ions in the contacting aqueous medium causing an extensive passivation of the base metal which would render the metal more electropositive and be most difficult to destroy.

In accordance with the present invention a pigment of this type is produced in the form of difficulty soluble complex potassium iron chromates by subjecting an easily water-soluble complex potassium iron chromate to a high temperature-high pressure treatment in an autoclave in the presence of about one to three parts and preferably twice its quantity by weight of water for a period of at least one hour and advantageously two hours, thereupon separating the resulting sparingly water-soluble pigment from the mother liquor and drying the pigment. The initial material may be any of the known easily water-soluble complex potassium iron chromates, for example:

$$7K_2O.6Fe_2O_3.20CrO_3.12H_2O$$

The temperature in the autoclave during the reaction is preferably kept at between about 180 and 220° C. which approximately corresponds to a water vapour pressure of between 10 and 20 atmospheres. In the case of the specific compound above referred to, the final product has approximately the summary formula:

$$3K_2O.11Fe_2O_3.16CrO_3.12H_2O$$

It is ochre-brown and has proved to be a pigment of high dispersiveness and excellent covering properties. The dispersiveness is somewhat dependent on the proportion of water used in the high temperature-high pressure treatment and increases with the proportion of water used. After drying, and without being subjected to special fine grinding, it consists of over 80% of particles below the size of $5\mu$. The high dispersiveness of the potassium-iron chromate produced in accordance with the aforedescribed process also results in a particularly high covering efficiency of the paint. Thus, with a pigment linseed oil varnish mixture containing 1 kilogram of red lead an area of 3.6 square metres can be covered, whilst the same mixture containing 1 kilogram of a pigment produced in accordance with the present invention can be made to cover an area of 10.8 square metres. With the pigments in accordance with the invention it is thus possible, when using a linseed oil varnish mixture as a vehicle, to cover three times the area as with the same quantity of red lead pigment, for the same covering power of both types of coatings.

The potassium iron chromate produced by the hereindescribed process is soluble in water to a slight extent: for example, after stirring for 200 hours, about 2 mg. of hexavalent chromium dissolve in 100 grams of water at 20° C., about 8 mg. at 50° C. and about 24 mg. at 100° C. This slight, but nevertheless existent tendency to emit chromate ions in the presence of water makes the potassium iron chromate pigment of the present invention highly suitable as a corrosion-preventing coating medium.

Comparative tests have shown that, for example, freshly emeried iron assumes a very high electropositive potential measured against a calomel electrode, after remaining for 50 hours in a stirred electrolyte consisting of distilled water containing a suspension of potassium-iron chromate produced in accordance with the invention. If, on the other hand, suspensions of red lead or colcothar be used, then the potential of the iron sheet is substantially less electropositive, as the following figures (given in terms of the normal hydrogen electrode) show:

| Electrolyte | Potential difference in millivolts |
|---|---|
| Distilled water | −74 |
| Distilled water+red lead | −158 |
| Distilled water+colcothar | −166 |
| Distilled water+K-Fe chromate (in accordance with the invention) | +132 |

This action on the surface of the metal was confirmed by the examination of metal parts which had been coated with the pigment of the invention. The coating was found to be far superior in its corrosion-preventing action to both red lead and colcothar coatings.

Iron sheets which had been painted with mixtures of red lead/linseed oil varnish, colcothar/linseed oil varnish and potassium-iron chromate/linseed oil varnish respectively, were exposed to the open atmosphere for eleven months. After that time, the sheets painted with red lead and also those painted with colcothar, showed numerous pittings of rust, while those coated with a pigment according to the invention showed no pittings at all and no external signs of corrosion.

In order to vary the shade of colour of the pigment, from 3% to 5% of various water-soluble chlorine compounds such as for example chlorides of sodium, manganese, zinc and copper can be added to the complex potassium-iron chromate before the pressure treatment, without reducing the corrosion-preventing action peculiar to the pigment obtained; thus for example a reddish-brown colour tone is obtained by the addition of between 3% and 5% of sodium chloride to the chromate before the pressure treatment.

I claim:

1. A process of producing a pigment which comprises subjecting an easily water-soluble complex potassium-iron chromate of the approximate composition $7K_2O \cdot 6Fe_2O_3 \cdot 20CrO_3 \cdot 12H_2O$ to a temperature of between about 180 and 220° C. with a corresponding pressure ranging between about 10 and about 20 atmospheres in an autoclave in the presence of between about 1 and about 3 parts its quantity by weight of water, and thereupon separating the resulting sparingly water-soluble pigment from the mother liquor.

2. A highly dispersed pigment having the approximate summary formula $$3K_2O \cdot 11Fe_2O_3 \cdot 16CrO_3 \cdot 12H_2O$$

and a limited solubility in water, said pigment being derived from a readily water-soluble complex potassium iron chromate compound by subjecting an aqueous suspension of the latter in an autoclave to a temperature above the boiling point of said suspension and to a corresponding superatmospheric pressure.

3. A process of producing a pigment having the approximate summary formula $$3K_2O \cdot 11Fe_2O_3 \cdot 16CrO_3 \cdot 12H_2O$$

and a limited solubility in water which comprises subjecting an aqueous suspension containing potassium oxide, iron oxide and chomium oxide substantially in the proportions prevailing in the compound $7K_2O \cdot 6Fe_2O_3 \cdot 20CrO_3$, such suspension being obtainable by suspending 1 part by weight of an easily water-soluble hydrated complex potassium iron chromate of corresponding composition in between about 1 and about 3 parts by weight of water, to a temperature above the boiling point of said suspension and to a corresponding superatmospheric pressure in an autoclave, and separating the resulting sparingly water-soluble pigment from the mother liquor.

4. A process of producing a pigment having the approximate summary formula $$3K_2O \cdot 11Fe_2O_3 \cdot 16CrO_3 \cdot 12H_2O$$

and a limited solubility in water which comprises subjecting an aqueous suspension containing potassium oxide, iron oxide and chomium oxide substantially in the proportions prevailing in the compound $7K_2O \cdot 6Fe_2O_3 \cdot 20CrO_3$, such suspension being obtainable by suspending 1 part by weight of an easily water-soluble hydrated complex potassium iron chromate of corresponding composition in between about 1 and about 3 parts by weight of water, to a temperature of between about 180 and 220° C. with application of a corresponding pressure ranging between about 10 and about 20 atmospheres in an autoclave, and separating the resulting sparingly water-soluble pigment from the mother liquor.

5. A process of producing a pigment having the approximate summary formula $$3K_2O \cdot 11Fe_2O_3 \cdot 16CrO_3 \cdot 12H_2O$$

and a limited solubility in water which comprises subjecting an aqueous suspension containing potassium oxide, iron oxide and chromium oxide substantially in the proportions prevailing in the compound $7K_2O \cdot 6Fe_2O_3 \cdot 20CrO_3$, such suspension being obtainable by suspending 1 part by weight of an easily water-soluble hydrated complex potassium iron chromate of corresponding composition in between about 1 and about 3 parts by weight of water, to a temperature above the boiling point of said suspension and to a corresponding superatmospheric pressure in an autoclave for at least about 1 hour, and separating the resulting sparingly water-soluble pigment from the mother liquor.

6. A process of producing a pigment having the approximate summary formula $$3K_2O \cdot 11Fe_2O_3 \cdot 16CrO_3 \cdot 12H_2O$$

and a limited solubility in water which comprises subjecting an aqueous suspension containing potassium oxide, iron oxide and chomium oxide substantially in the proportions prevailing in the compound $7K_2O \cdot 6Fe_2O_3 \cdot 20CrO_3$, such suspension being obtainable by suspending 1 part by weight of an easily water-soluble hydrated complex potassium iron chromate of corresponding composition in between about 1 and about 3 parts by weight of water, to a temperature above the boiling point of said suspension and to a corresponding superatmospheric pressure in an autoclave for about 2 hours, and separating the resulting sparingly water-soluble pigment from the mother liquor.

7. A process of producing a pigment having the approximate summary formula $$3K_2O \cdot 11Fe_2O_3 \cdot 16CrO_3 \cdot 12H_2O$$

and a limited solubility in water which comprises subjecting an aqueous suspension containing potassium oxide, iron oxide and chromium oxide substantially in the proportions prevailing in the compound $7K_2O \cdot 6Fe_2O_3 \cdot 20CrO_3$, such suspension being obtainable by suspending 1 part by weight of an easily water-soluble hydrated complex potassium iron chromate of corresponding composition in between about 1 and about 3 parts by weight of water and containing between about 3% and about 5% of the weight of said oxides of a water-soluble chloride, to a temperature above the boiling point of said suspension and to a corresponding superatmospheric pressure in an autoclave, and separating the resulting sparingly water-soluble pigment from the mother liquor.

HUGO QUERENGÄSSER.